United States Patent [19]

Seader

[11] Patent Number: 4,978,271

[45] Date of Patent: Dec. 18, 1990

[54] RECYCLEABLE MATERIAL HANDLING APPARATUS

[75] Inventor: Jack G. Seader, Longmont, Colo.

[73] Assignee: Western Disposal, Inc., Boulder, Colo.

[21] Appl. No.: 376,252

[22] Filed: Jul. 6, 1989

[51] Int. Cl.$^5$ ........ B60P 1/28

[52] U.S. Cl. ........ 414/487; 414/408; 414/421; 414/558; 220/908

[58] Field of Search ........ 414/486, 487, 408, 409, 414/403, 404, 501, 419, 421, 422, 425, 558, 554, 546; 220/22, 1 T, 20, 21

[56] References Cited

U.S. PATENT DOCUMENTS

| | | | |
|---|---|---|---|
| 1,920,485 | 8/1933 | Silver | 414/487 X |
| 2,929,658 | 3/1960 | Killebrew | 414/421 X |
| 3,452,891 | 7/1969 | Wilson et al. | 414/409 |
| 3,504,813 | 4/1970 | Weir | 414/408 X |
| 4,200,334 | 4/1980 | Lindholm | 414/421 X |
| 4,470,747 | 9/1984 | Tichenor | 414/491 |
| 4,741,658 | 5/1988 | Zelinka et al. | 414/558 X |
| 4,840,531 | 6/1989 | Dinneen | 414/409 |

FOREIGN PATENT DOCUMENTS

| | | | |
|---|---|---|---|
| 2080757 | 2/1982 | United Kingdom | 414/408 |

*Primary Examiner*—Frank E. Werner
*Attorney, Agent, or Firm*—Vaden, Eickenroht, Thompson & Boulware

[57] ABSTRACT

The invention relates to a vehicular apparatus for use in handling recycleable material which includes a pair of end-to-end first containers supported on each side of the vehicle and each having a side opening into which such material may be loaded at a place of connection, and a pair of second and larger containers supported on the vehicle above and intermediate the pairs of first containers and each having a top opening to receive material from a first container. Each pair of first containers are adapted to be moved together between their loading positions and unloading positions in which the side opening in each is arranged to dump material therefrom into the top opening in a second container, and each of the second containers is adapted to be moved independently of the other between its loading position and an unloading position in which its top opening is arranged to dump material therefrom onto a place of disposal at the side of the vehicle.

7 Claims, 3 Drawing Sheets

RECYCLEABLE MATERIAL HANDLING APPARATUS

This invention relates generally to apparatus for use in handling recycleable material. More particularly, it relates to improved vehicular apparatus for use in collecting recycleable material and then delivering it to and unloading it at a place of disposal.

Due to the increasing attention being given to the recycling of plastic containers and other types of recycleable material, there is a need for apparatus of this type, as, for example, in collecting the material at a large number of curbside residential locations and delivering it to a recyling plant or another location distant from the residential location for transshipment to a recyling plant. Preferably, the material is collected at one level accessible to individuals for loading at curbside, but unloaded at another, higher level.

For several reasons, conventional garbage or other waste handling vehicular apparatus is ill suited for these purposes. For example, it may be necessary to separately handle different types or categories of the recycleable material, and, in particular, to maintain them segregated during collection, transport and disposal, and, in some cases, permit them to be unloaded at different disposal locations. It is therefore an object of this invention to provide apparatus of this type which is particularly well suited for these purposes, and, more particularly, which is of compact construction and easily and quickly operated.

This and other objects are accomplished, in accordance with the illustrated embodiment of the present invention, by apparatus which comprises a vehicle having a base, a first container supported on the base and having an opening in a side thereof into which recycleable material may be loaded at a place of collection, and a second and larger container supported on the base and having an opening in the top thereof into which the material from the first container may be unloaded. More particularly, a means is provided for moving the first container between its loading position and an unloading position in which its side opening is arranged to dump material therefrom into the top opening of the second container, and for moving the second container between its loading position and an unloading position in which its top opening is arranged to dump material therefrom onto a place of disposal at the side of the base.

Thus, during use of the apparatus, the vehicle may be moved to a collection point, such as curbside at a residential or industrial location to permit a parcel of the material to be manually loaded into the first container through its side opening. That load of material is then unloaded from the first container into the second container, and the first container is returned to its supported position for receiving a further parcel of recyleable material at another curbside location, whereby a large number of parcels of the recycleable material may be loaded into the larger second container. Then, upon movement of the vehicle to a place of disposal, such as at a recycling plant, or at a location for transshipment to a recycling plant, the material accumulated in the second container may be dumped onto the place of disposal.

In the preferred and illustrated embodiment of the invention, there are a pair of first containers supported in end-to-end relation on at least one and preferably on both sides of the base of the vehicle, as well as a pair of second containers supported on the base in end-to-end relation adjacent the inner sides of the pairs of first containers so that material from each first container may be unloaded into a second container. Thus, parcels of different types of material may be loaded, transported and unloaded separately of one another.

Since each of the first containers unloads into its respective second container, there is no need for dumping the material therein independently of the other. Thus, both first containers of each pair on each side of the apparatus may be moved together between their supported and unloading positions. On the other hand, the second containers may be moved independently of one another between their loading and unloading positions to permit unloading each type of recyleable material at a different location, as may be desirable in the recycling process. Obviously, if desired, however, the material from the two second containers may be unloaded together.

In the interest of conserving space, the bottom portion of each second container is intermediate the inner sides of adjacent first containers, and preferably the bottom portion of the second container has outer sloped sides adjacent the inner sloped sides of the first container in the supported positions of the containers. Also, the second container has outer sides which extend above the outer sides of the adjacent first container, thus providing larger capacity by the extension of its upper end, and the first containers move upwardly past the upper sides of the second containers prior to moving inwardly over the tops thereof and then tilted to dumping position.

The base includes an upright framework on the front and rear ends of the second containers, and the means for moving the first containers includes first linkage pivotally connected to the framework and to the first container, an extendable and contractable actuator connected to the framework and to the first linkage intermediate the pivotal connections to the framework and the first container, for swinging the first linkage about its pivotal connection to the framework, as well as second linkage pivotally connected to the framework and to the first containers so as to cause the first containers to be rotated about their pivotal connection to the first linkage and thus tilted into positions in which their side openings are in dumping positions as it moves over the top of the second container. The second containers, on the other hand, are pivotally connected to the base near one side of the framework, and the means for moving the second containers includes links pivotally connected to one another and at their opposite ends to the framework and to the second containers, together with an extendable and retractable actuator pivotally connected to the base and one of the links intermediate its pivotal connections to the frame and the other link so as to swing the second containers about their pivotal connection to the framework and thus tilt the top openings in the second containers into dumping position as they move over the side of the vehicle base.

In the drawings, wherein like reference characters are used throughout to designate like parts:

Figure 1:
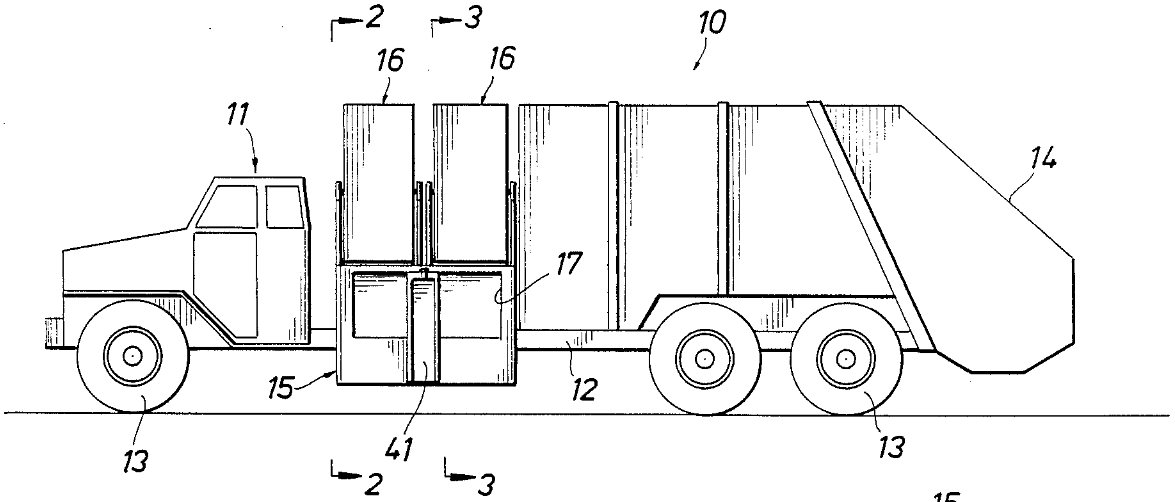
FIG. 1 is a side view of vehicular apparatus constructed in accordance with the present invention.

With reference now to the details of the above described drawings, the overall apparatus shown in FIG. 1, and indicated in its entirety by reference character 10, includes a vehicle 11 in the form of a truck having an elongate base 12 supported above ground level by wheels 13. The vehicle may be of a type commonly used in the collection of garbage, and, for this purpose, is shown to include a rearward loading and compacting section 14.

Figure 2:
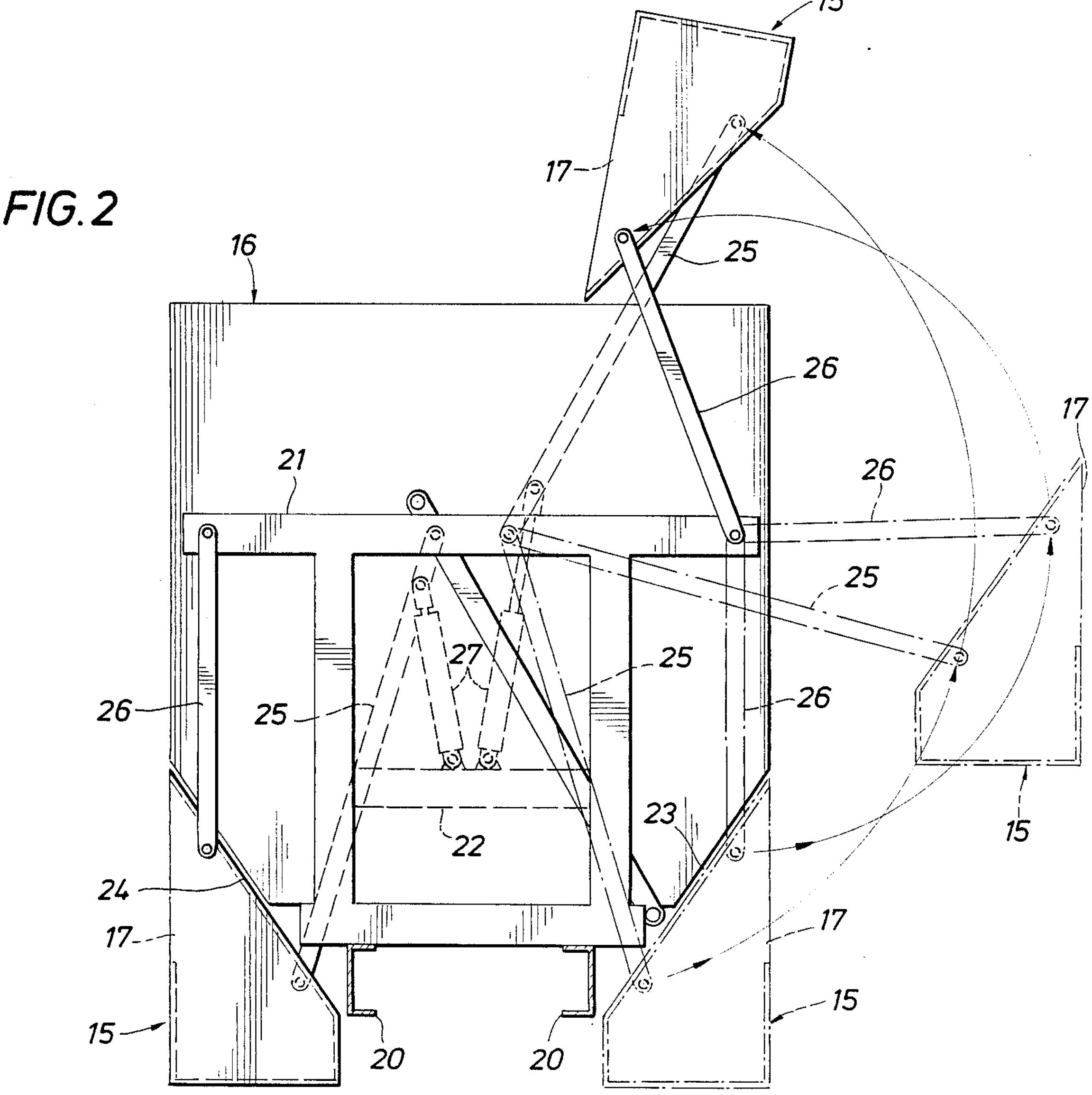
FIG. 2 is an enlarged cross-sectional view of the apparatus of FIG. 1, as seen along broken lines 2—2 thereof, and showing one of the first containers raised from its loading to its unloading position.

In accordance with the present invention, however, a pair of first containers 15 are supported in end-to-end relation on each opposite side of the base and forwardly of rear section 14, and a pair of second containers 16 are supported in end-to-end relation on the base, with each second container generally intermediate adjacent first containers on opposite sides of the vehicle. More particularly, each first container has an opening 17 in its outer side, and each second container 16 has an opening 18 in the top thereof. During use of the apparatus, recycleable material may be loaded into one or both of the first containers through its opening 17 at a suitable point of collection, which may be curbside in a residential area, and the material in each such first container may be dumped through the opening 17 and into the opening 18 in the top of the second container upon movement of the first container between its supported or loading position, as shown in FIG. 2, for example, and its dumping or unloading position, as shown in solid lines at the top of FIG. 2. The second container may then be moved from its supported or loading position, as shown in solid lines in FIG. 3, into its unloading position, as shown in broken lines, so as to dump material from the second container onto a place of disposal at the side of the base, which, as previously mentioned, may be at a recycling plant, or at another location for transshipment to a recycling plant.

The base 12 includes a pair of longitudinal channels 20 and a framework including four upright "T" shaped frames 21 supported on and fixed at their lower ends to the channels. A pair of such frames are disposed generally intermediate the two second containers, while third and fourth frames are mounted on the outer ends of the second containers. The interior frames differ from the outer frames in that they are connected by a beam 22 which extends laterally of the apparatus for a purpose to be described.

As previously described, in its loading position, each of the first containers 15 is supported on the base of the vehicle with its lower end near ground level, and thus with its opening 17 in a position to permit a parcel of material to be lifted from the curbside into the opening. The inner sides 23 of the first containers extend upwardly and outwardly adjacent similarly sloped outer sides 24 of the bottom portion of the second container intermediate first containers on opposite sides thereof, thus providing a compact arrangement of the containers within the normal outer dimensions of the vehicle. On the other hand, the outer sides of the top portions of the second containers extend vertically above the outer sides of the first containers so as to increase the capacity of the second container.

Figure 3:
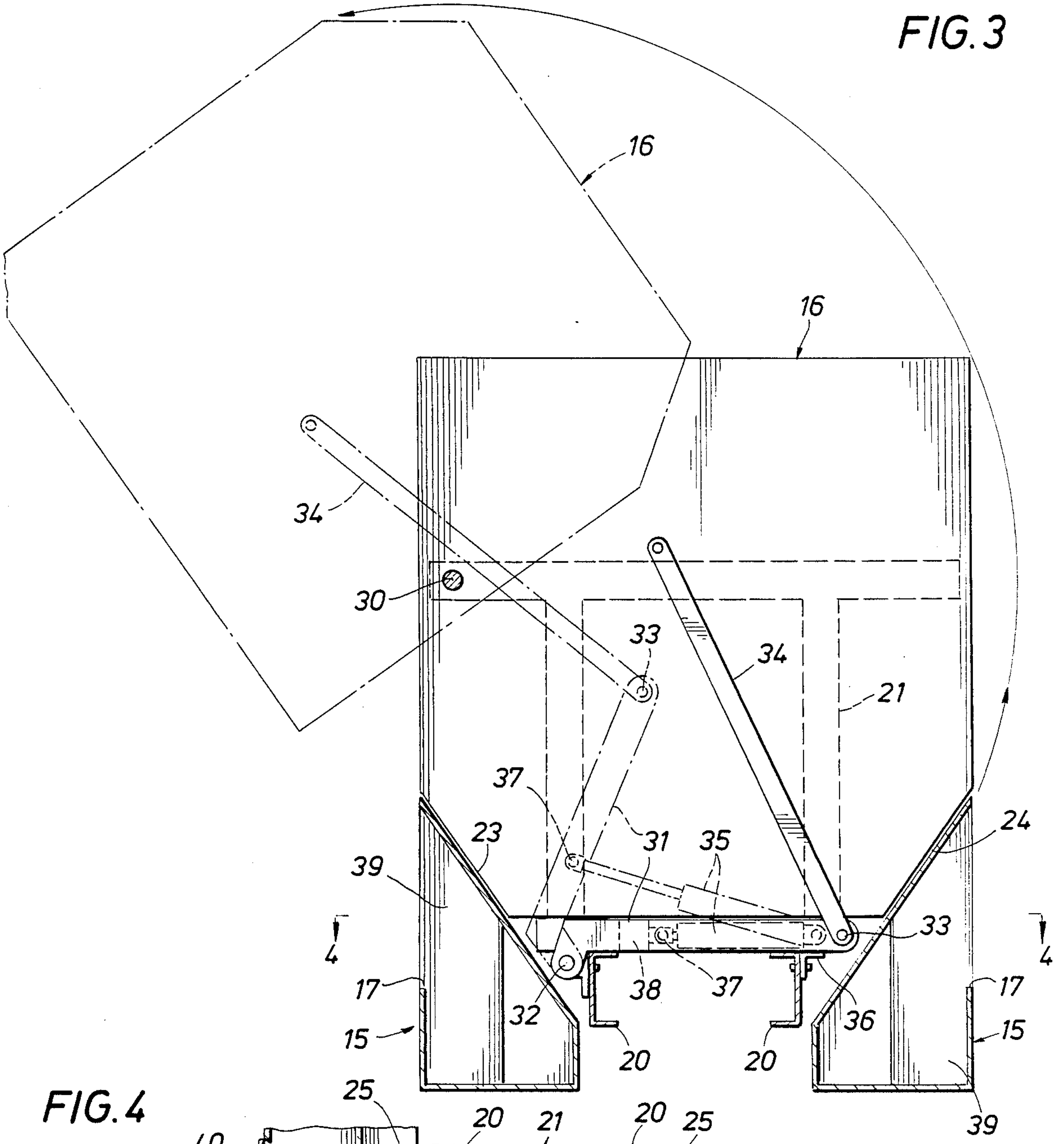
FIG. 3 is an other cross-sectional view of the apparatus of FIG. 1, as seen along broken lines 3—3 thereof, and showing the second container in broken lines upon movement from its loading to its unloading position.

Although the top opening in the second container may be above the reach of the individuals at curbside, the material collected in the first containers is raised and dumped into the second container by a mechanical operator, as will be described. Similarly, when the loaded material has been transported to a place of disposal, it may be dumped to the side of the apparatus by another mechanical operator, which as best shown in FIG. 3, is of such construction and arrangement that its top opening is at a relatively high level when unloading so that the material may be dumped onto a raised surface.

The pair of first containers at each side of the vehicle are supported from the base by means of a first link 25 disposed between the interior frames 21 and pivotally connected at its opposite ends to the frame and the pair of end-to-end first containers, as well as a pair of second links 26 disposed on the outer sides of the outer frames and pivotally connected at their opposite ends to the frame and to each of the pair of first containers. More particularly, and as best shown in FIG. 2, link 25 is connected to the interior frames near their upper ends and generally intermediate the opposite sides of the apparatus, and to the first containers near their inner sides generally intermediate their upper and lower ends. The second links 26, on the other hand, are pivotally connected to the exterior frames at their upper ends and adjacent the sides thereof on which the first containers are supported, and pivotally connected at their opposite ends to the outer ends of the first containers near their upper corners.

Each pair of extendable and retractable hydraulic actuators 27 is pivotally connected at its opposite ends to the cross beam 22 between the interior frames 21 and the link 25 connected to the pair of first containers on each side of the vehicle. More particularly, the lower end of each actuator is connected to the beam 22 generally intermediate the opposite sides of the apparatus, while its upper end is pivotally connected to the link 25 near the pivotal connection of the interior frame. Thus, as best shown in FIG. 2, upon extension of the actuators, the link 25 is swung about its pivotal connection to the frame to cause the first containers to move outwardly, upwardly and then inwardly, and thus past the outer side of the second container and over the top thereof, from the supported positions to the dumping positions shown in solid lines in FIG. 2. During the latter part of the movement of the first container, the second links 26 cross link 25 so as to rotate or tilt the first container into a position in which its side opening 17 is arranged to dump material from the first container into the opening 18 in the second container as the first container moves inwardly over the top of the second container thus preventing spillage of material outside of the second container. Following loading of the material into the second container, the actuators 27 are retracted so as to move the first containers back from their unloading positions to their supported or loading positions. The paths of the pivotal axes of the connections of the links 25 and 26 to the first container are indicated by broken lines A and B.

As previously described, each of the second containers is independently movable from loading position to unloading position, thus permitting each to be unloaded at a different place of disposal. For this purpose, the opposite ends of each second container are pivotally connected at 30 to the interior and exterior frames 21 on the opposite ends thereof. More particularly, as shown in FIG. 3, pivot pins 30 are located near one side of the apparatus generally intermediate the upper and lower ends of the second container so that it is free to be swung from the supported position shown in solid lines to the dumping position shown in broken lines in FIG. 3.

Each second container is also supported from the base of the vehicle by linkage which includes a first "H" shaped link 31 pivotally connected at 32 to brackets on the left-hand channel of the base, as shown in FIG. 3, and pivotally connected by a pin 33 at its opposite end to second links 34 on opposite ends of each second container. Links 34 are connected at their upper ends to the adjacent ends of each second container generally intermediate its sides and slightly above the level of the pivot pin 30. In the supported position of the second container, the link 31 rests upon the tops of the channels 20 of the base so as to support the second container with its sloped lowered sides adjacent the sloped inner sides of the first containers in their supported or loading positions.

Figure 4:
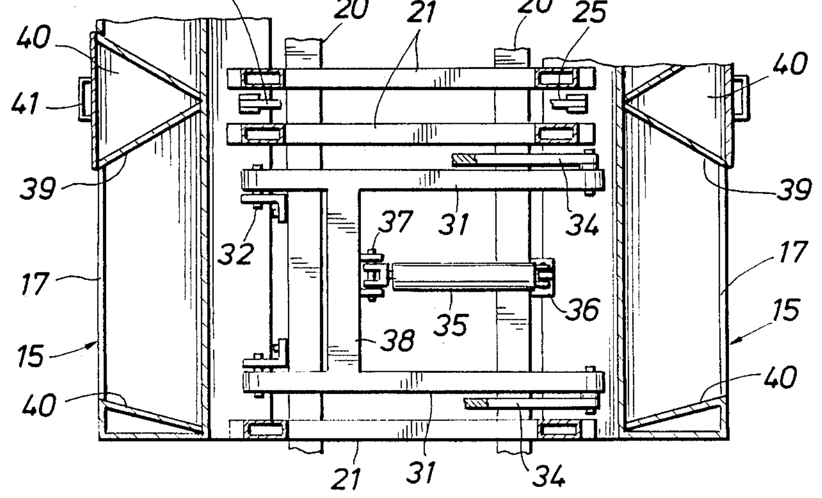
FIG. 4 is a horizontal sectional view of the apparatus, as seen along broken lines 4—4 of FIG. 3.
Figure 5:
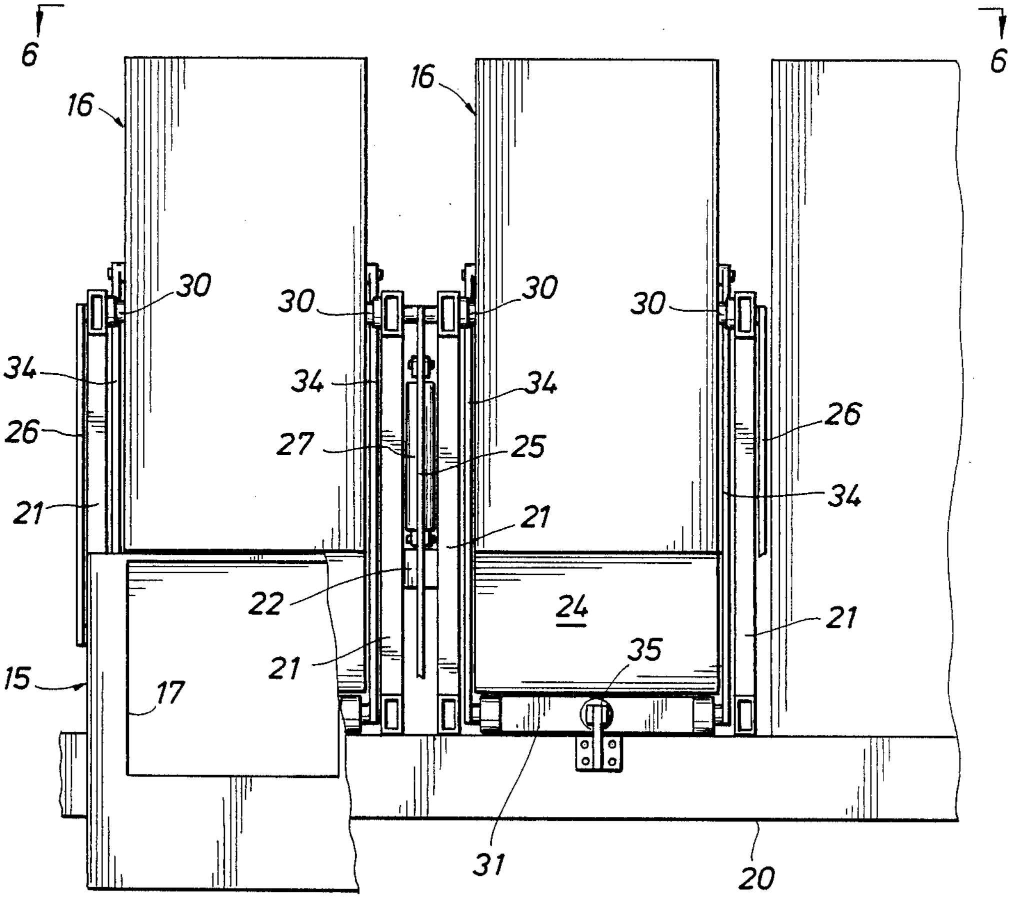
FIG. 5 is a enlarged view of the side of the apparatus, as shown in FIG. 1, but upon removal of one of the first containers for illustrative purposes.
Figure 6:
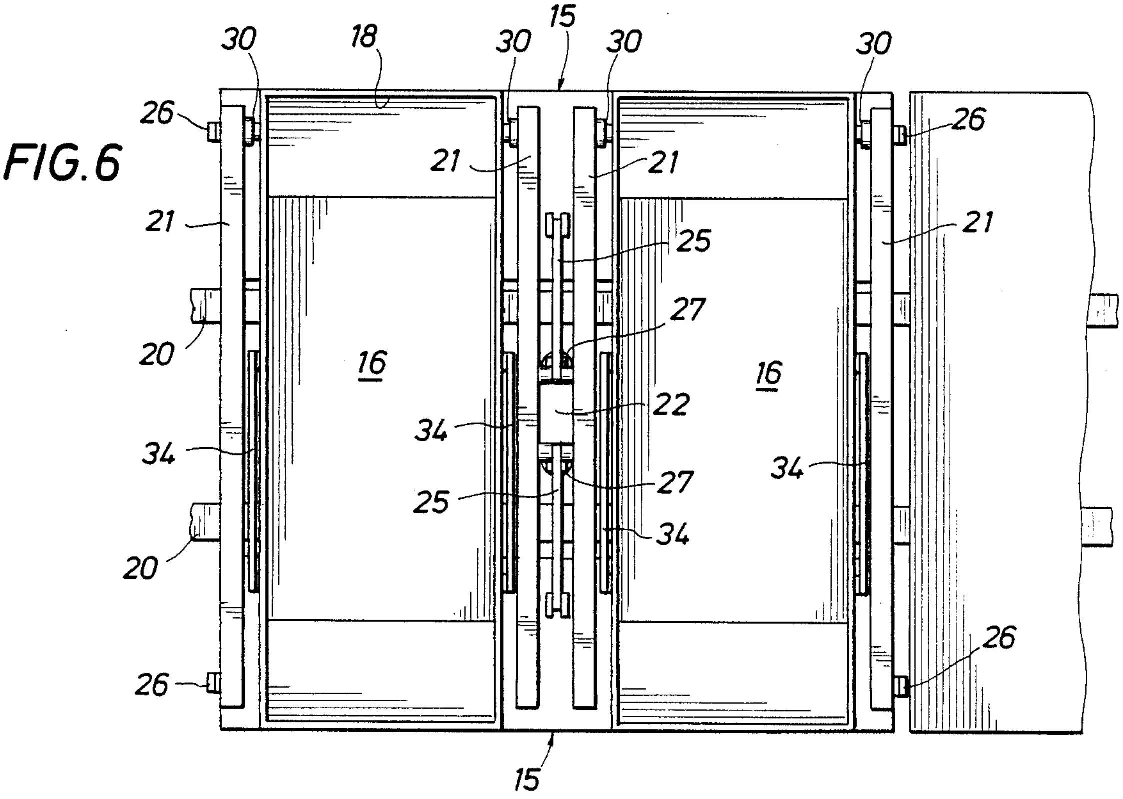
FIG. 6 is a plan view of the top of the apparatus, as seen along broken lines 6—6 of FIG. 5.

Each of the second containers is moved between its loading and unloading positions by means of a extendable and retractable hydraulic actuator 35 pivotally connected at one end to a bracket 36 on the right-hand channel, as shown in FIGS. 3 and 4, and at its opposite end to a bracket 37 on cross member 38 of the link 31 to the right and above the pivotal connection 32 of the first link 31 to the base of the vehicle. Thus, as indicated by broken lines in FIG. 3, extension of the actuator 35 will force the first link 31 to swing upwardly from its supported position and in a counterclockwise direction, which in turn raises the pivotal connection of the first link to the second link 34. This, together with the fixed pivotal connection 30 of the ends of the second container to the frame causes the second link 34 to move upwardly and to the left to tilt the second container from the solid line loading position to the broken line unloading position of FIG. 3 wherein its top opening is arranged to dump material therefrom as it moves over the side of the adjacent first container. Then, of course, following unloading of material from the second container, the actuator is retracted to controllably move or swing the link 31 in a clockwise direction, as shown in FIG. 3, and thus, through the link 34 and the pivotal connection 30, rotate the second container back to its supported position in which the opening 18 is at its top.

As best shown in FIG. 4, the opposite ends 39 and 40 of the first containers are tapered inwardly toward their outer sides. Thus, the ends of adjacent first containers form a "V" shaped space 40 between them which may be closed by a door 41. The space may of course be used to store various equipment or articles, as may be convenient.

There are of course obvious alternatives to the above described embodiment of the present invention. For example, there may be more than two first containers, on each side of the vehicle base, and thus a corresponding number of second containers. Also, there may, if desired, be means for moving each such first container independently of the other, although, for reasons previously discussed, it is not anticipated that this would be required in the use of this apparatus. Furthermore, with a modified operating mechanism, each of the second containers could be selectively moved into dumping position on either side of the vehicle.

Reviewing now the overall operation of the apparatus, the vehicle may travel throughout a neighborhood in order to collect recycleable material at various curbside locations therealong. The disposal of at least one first container on each side of the vehicle will of course facilitate collection of the material on either side of the street. The inclusion of a pair of first containers on each side permits one type of recycleable material to be collected in one and another type of recycleable material to be collected in the other first container. Also, of course, the four first containers enable separate collection of four different types of recycleable material.

When the first containers are loaded, they are swung outwardly, upwardly and inwardly to dump material therein into the second containers. Thus, the first and second containers are so arranged that material from one first container is unloaded into one of the second containers, and material from the first containers is loaded into the other second container. Also, the second container may be loaded with material from first containers on both sides simultaneously.

Upon return of the first containers to their loading positions, additional recycleable material may be collected therein at subsequent curbside locations, and then unloaded into a second container. All of this may occur during the collection process, so that when the vehicle reaches the point of disposal for disposing of the recycleable material, the several parcels are accumulated in the second containers. If desired, both second containers may be unloaded at the same place of disposal. However, the means for operating the second containers enables one to be unloaded at one location, and the other unloaded at another location, thus permitting different types of recycleable material to be unloaded at different recycling stations.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for use in handling recycleable material, comprising a vehicle having an elongate base, a first container supported on the base and having an opening in the outer side thereof through which such material may be loaded at a place of collection, a second and larger container supported on the base and having an opening in its top into which material from the first container may be loaded and a bottom portion which is disposed above a top portion of the first container and an outer side above the outer side of the first container, when the containers are in their loading positions, means for moving the first container outwardly, upwardly and inwardly as well as outwardly, downwardly and inwardly past the outer side of the second container between a loading position in which its side opening is disposed on a side of the vehicle and an unloading position in which it is tilted to arrange its side opening for dumping the material loaded therein into the top opening of the second container, and means for moving the second container upwardly and outwardly and inwardly and outwardly between a loading position in which its top opening is at the top of the vehicle and an unloading position in which its top opening is arranged for dumping material therein onto a place of disposal to one side of the base.

2. Apparatus of the character defined in claim 1 wherein the top portion of the first container has a sloping inner side adjacent a sloping outer side of the bottom portion of the second container in their loading positions.

3. Apparatus of the character defined in claim 1, wherein the base includes an upright framework on the front and rear ends of the second container, and the means for moving the first container includes first linkage pivotally connected to the framework and to the first container, second linkage pivotally connected to the framework and to the first container, and an extendable and retractable actuator pivotally connected to the framework and to the first linkage intermediate its pivotal connections to the framework and the first container for swinging the first linkage about its pivotal connection to the framework and thus causing said second linkage to tilt the first container about its pivotal connection to the first linkage into and out of dumping position.

4. Apparatus of the character defined in claim 3, wherein the means for moving the second container includes means pivotally connecting the second container to the base near said one side of the framework, links pivotally connected to one another and at their opposite ends to the framework and to the second container, and an extendable and retractable actuator pivotally connected to the base and one of the links intermediate its pivotal connections at both ends so as to swing said second container about its pivotal connection to the framework and thus move the top opening into and out of dumping position.

5. Apparatus of the character defined in claim 1, wherein there are a pair of end-to-end first containers on each side of the base and a pair of end-to-end second containers with each first container being movable into an unloading position to dump material into one of the second containers.

6. Apparatus of the character defined in claim 5, wherein the means for moving the first containers causes them to move together, and the means for moving the second containers permits them to be moved independently of one another.

7. Apparatus of the character defined in claim 5, wherein the top portion of each first container has a sloping inner side adjacent a sloping outer side of the bottom portion of the adjacent second container.

* * * * *